Aug. 29, 1939.     C. S. MINTON     2,171,042
VEHICLE STAND AND GUARD
Filed June 16, 1937     2 Sheets-Sheet 1
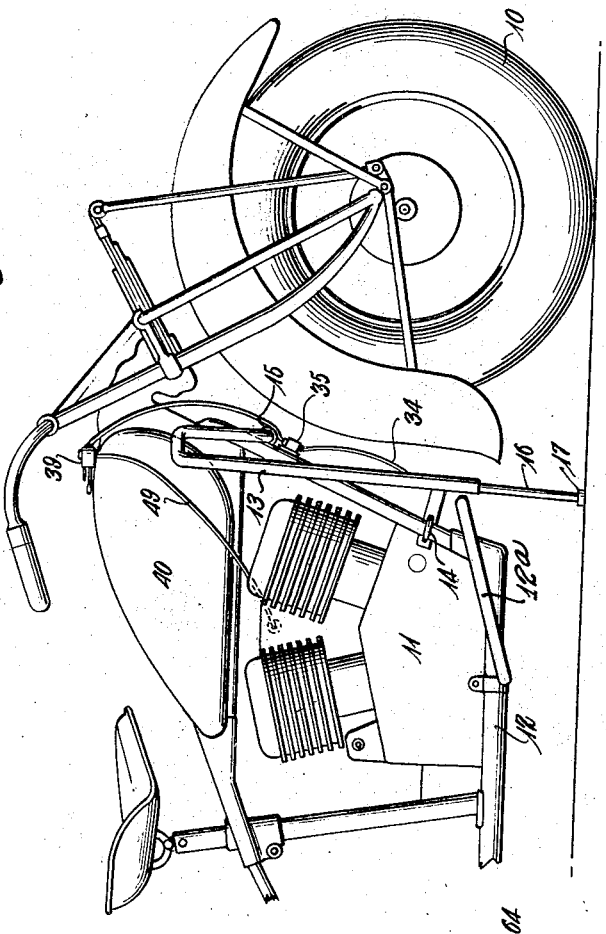
Inventor
Clarence S. Minton
By Ralph A. Hammas
Attorney Aug. 29, 1939.  C. S. MINTON  2,171,042
VEHICLE STAND AND GUARD
Filed June 16, 1937  2 Sheets-Sheet 2
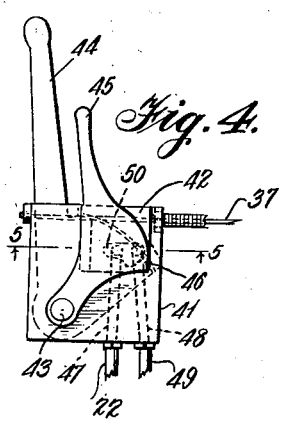
Fig. 4.
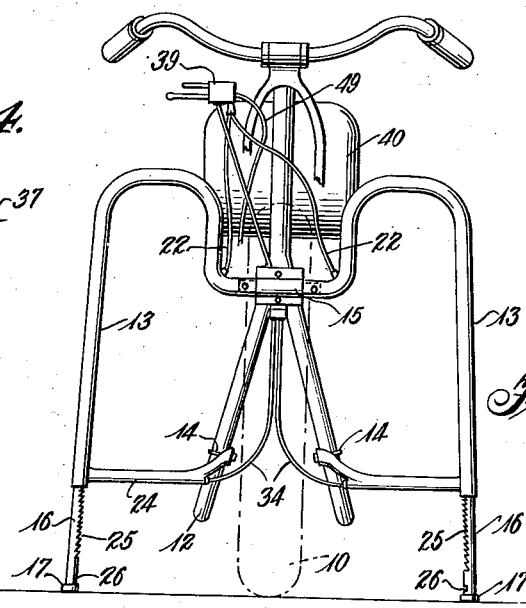
Fig. 2.
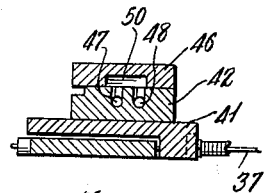
Fig. 5.
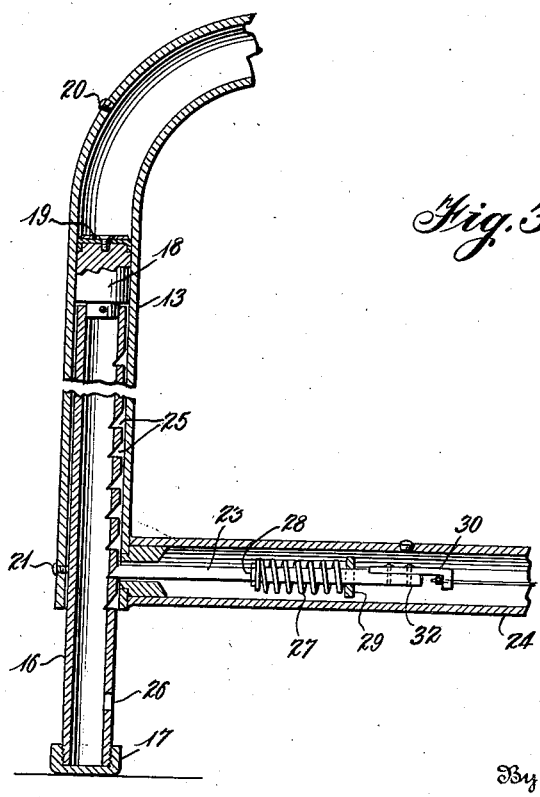
Fig. 3.
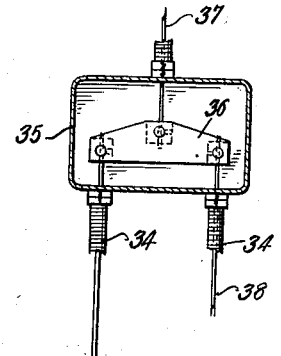
Inventor
Clarence S. Minton
By Ralph A. Hammar
Attorney Patented Aug. 29, 1939

2,171,042

UNITED STATES PATENT OFFICE 2,171,042

VEHICLE STAND AND GUARD

Clarence S. Minton, Laurel, Miss.

Application June 16, 1937, Serial No. 148,579

8 Claims. (Cl. 180—33)

My present invention relates to vehicle supports and more particularly to a support for two-wheeled vehicles.

Various types of supports have been known for use with bicycles and motorcycles. One of these types, generally known as a "jiffy stand", comprises a bar pivotally fastened to a low part of the vehicle. The bar is adapted to be swung outward to maintain the machine in a tilted rest position and to be swung inward so that the bar may not strike the ground while the vehicle is in motion.

A second known type of stand is that which extends around the back wheel and is pivoted at either side of that wheel to be swung underneath that wheel to support it free from the ground. It is necessary to dismount from a motorcycle in order to use that type of stand.

A third type of stand, known but not commonly used, provides two members which may be extended downwardly on each side of the vehicle to engage the ground and support the machine upright. There has been an objection to this type of stand in that it could not be used except on level ground.

It is an object of my invention to provide a device which will overcome the objectionable features of each of the known types of stands.

It is a further object of my invention to provide an improved support of the third type mentioned.

A further object is to provide a new and improved vehicle support which is power operated.

Another object is to provide a stand which will allow easy parking and general use of a motorcycle.

An additional object is to provide a stand which will support part of the vehicle free of the ground.

It is also an object to provide a support which will give protection to the driver of the machine in case of accident.

The invention will be better understood from the following description when taken in connection with the accompanying drawings and its scope will be pointed out in the appended claims.

Reference is had to the accompanying drawings in which Figure 1 is a side view of a motorcycle showing one embodiment of the device of my invention applied thereto; Figure 2 is a front view of the motorcycle shown in Figure 1 with the front wheel and its accompanying steering post removed; Figure 3 is a view in section of the stand and guard of my invention with a part of the associated control; Figure 4 is a view of the control handles for my invention; Figure 5 is a sectional view taken on line 5—5 of Figure 4; Figure 6 is a modified type of control handle similar to that shown in Figure 4; and Figure 7 is a front view of a motorcycle with a modified form of my invention applied thereto.

In Figure 1 the conventional motorcycle has a front wheel 10 and a back wheel (not shown). The motor 11 is supported in a frame 12 to which is attached the usual footboards 12a. A generally U-shaped tubular member 13 extends from each side of the machine and is rigidly fastened to the frame near the motor base at 14 and near the steering knuckle at 15 just ahead of the usual footboards. These U-shaped tubular members 13 and their associated structure are designed to act as a guard to protect the rider of a motor cycle from being crushed if it should collide with another object. The vertical portion of tubular member 13 forms a cylinder in which a slide 16 is slidably mounted. On the lower end of slide 16 is a shoe 17 of somewhat larger diameter than the slide 16. The slide 16 is adapted to drop downward into contact with the ground to serve as a stand for the machine.

As may be seen more clearly in Figure 3, the slide 16 has at its upper end a piston 18 of brass or other suitable material. Piston 18 fits the cylinder walls closely and is loosely fastened to slide 16. Means is provided on piston 18 to seal it against the passage of air. It is preferred here to use a leather washer 19. An oil plug 20 is provided so that oil may be supplied for piston 18 and washer 19. A set screw 21 is secured in the lower end of tubular member 13 and extends into a longitudinal slot (not shown) cut in the wall of slide 16. This set screw prevents the slide 16 from turning. The piston 18 and appended slide 16 are actuated by vacuum from the engine 11, the intake manifold of which is connected by tubing 22 (Figure 2) to tubular member 13. A plug (not shown) in the tubular member 13 prevents ingress of air from the direction opposite to piston 18.

A latch member 23 is provided to maintain the slide 16 in any desired position. Latch member 23 is slidably mounted in horizontal portion 24 of tubular member 13 and is adapted to engage a plurality of suitable notches 25 formed in slide 16. A notch 26 formed near the lower end of slide 16 provides means for holding slide 16 completely out of engagement with the ground while the machine is in motion. The latch member 23 is biased toward engagement with notches 25 and 26 by spring 27 coiled around latch 23 and bearing on collar 28 integral with latch 23. The other end of spring 27 rests on bearing plate 29 fastened in horizontal portion 24 of tubular member 13. Bearing plate 29 is adapted to be placed in horizontal portion 24 through a slot (not shown). Bearing plate 29 is then riveted or welded in place.

Suitable means 30 is used to fasten a Bowden control wire 31 to the end 32 of latch member 23. The Bowden control wire 31 passes out of horizontal portion 24 at bend 33 into the usual flexible cable 34.

At its other end the Bowden control wire 31 enters a junction box 35 where it is attached to one end of yoke member 36. The junction box 35 is preferably attached to the frame 12 near the point 15 where tubular member 13 is connected to the frame. A Bowden wire 37, which leads to the control handle is attached to the center of yoke member 36. A Bowden wire 38 is attached to the other end of the yoke member 36. This Bowden wire 38 leads to an identical stand arrangement for the opposite side of the motorcycle as has been described above. The yoke member 36 provides means for allowing operation of only one of the slides 16 at a time if so desired.

A control device 39 is mounted on the gas tank 40 near the usual switchboard. As is shown in detail in Figures 4 and 5, this control device 39 has a base portion 41 fixed to the tank 40 and a supporting portion 42 fixed to the base portion 41. In the supporting portion 42 is a pin 43 on which are pivoted control handles 44 and 45. Control handle 44 operates latch 23 by Bowden wire 37, yoke 36, and Bowden wire 31. Control handle 45 regulates the connection of the intake manifold of engine 11 to the tubing 22 which leads in turn to the tubular member 13. This regulation is effected by means of a three way valve of which part 46 of the handle 45 forms the sliding valve cover, as is best shown in Figure 5. The part 46 of handle 45 slides on supporting portion 42 in which are cut ports 47 and 48.

Valve port 47 leads to tube 22 which is shown in Figure 2 attached to tubular member 13. Valve port 48 leads to tube 49 which in turn is connected to the intake manifold (not shown) of the internal combustion engine 11.

In the position shown in Figures 4 and 5 the control handle 45 retains valve recess 50, cut in part 46 of handle 45, so that the tube 49 and the port 48 are connected to port 47 and tube 22. This will form a vacuum in tubular member 13 which will draw piston 18 and slide 16 upward if latch member 23 is not engaged in notches 25 and 26.

If the control handle 45 be moved to the left, port 48 will be covered and port 47 will remain in sole communication with valve recess 50. If the handle 45 be moved still further to the left, the recess 50 will ride over the edge of block member 42 and allow the ingress of outside air to port 47. This will allow piston 18 and slide 16 to fall readily under the influence of gravity provided latch member 23 is not engaged with notches 25 and 26.

The normal operation of the device is apparent. While the machine is in motion, latch 23 is engaged in notch 26 and handle 45 is in mid-position to close off port 47. When the machine comes to rest, both handles are pulled all the way to the left. Handle 44 withdraws latch 23 from notch 26 and handle 45 allows air to enter port 47 and tube 22. Piston 18 and slide 16 drop under the influence of gravity. Since there is a duplicate slide 16 on each side of the machine, release of handle 44 will latch both slides 16 in place to support the motorcycle vertically. It is immaterial that the ground may not be level because either slide 16 will drop as far as is necessary to support the machine vertically and will then be latched in place by release of handle 44.

When the driver desires to use the machine, he starts the engine, pushes handle 45 to the right and pulls handle 44 to the left. Handle 44 releases latch 23 and handle 45 places valve recess 50 so that vacuum from tube 49 is admitted to tube 22. Both slides 16 will then be drawn upwardly by the vacuum and on release of handle 44 will be latched in place by engagement of latch 23 with notch 26. Handle 45 is then placed in mid-position to shut port 48 and close off port 47.

The stand may be very advantageously used to hold the front wheel raised from the ground in order to change the front wheel. When the machine is in the parked position with both of slides 16 on the ground, the driver's foot is placed on shoe 17 and the machine is rocked to the opposite side by lifting to extend the slide from its cylinder. The slide will remain latched in the plurality of notches 25 as far out as it may be extended. Then the driver, by lifting the other side of the machine while holding his foot on the other shoe 17, may raise the machine to a level position with the front wheel 19 free of the ground and at any desired height.

To lower the machine from its raised position, pressure is applied to handle 44 just insufficient to release latch 23. The machine is lifted slightly on one side to release the corresponding latch and that side may then be lowered. The latch on the other side will remain fixed because the weight of the machine will remain on it. When the machine is thus partially lowered, the front wheel will rest on the ground and the stand on one side of the machine will be so far extended that it will force the machine to remain tilted. To right the machine the lever 44 may be pulled all the way to the left to release the extended stand. To place the vehicle in parked position it is necessary only to pull levers 44 and 45 as in parking the machine.

Although it is not necessary that control handle 45 be operative to three positions, I find it advantageous. Leaving that handle in mid-position, where all ports are closed, prevents leakage of air to the engine intake manifold while the vehicle is in motion.

The control handles 44 and 45 and their accompanying parts may advantageously be combined in a single control handle as shown in Figure 6. The plate 51 is adapted to be fixed to the gas tank 40. The valve ports 52 and 53 therein are connected respectively to the intake manifold of the engine 11 and the outside air. The valve port 54 is connected to the tubing 22 which leads to tubular member 13. A sliding valve plate 55 is spring biased against an abutment 56 integral with plate 51. Handle 57 which is attached to slide plate 55 passes under bridge member 58 and retains slide plate 55 pressed firmly against plate 51. A channel 59 is cut in the face of slide plate 55 resting against plate 51 and is permanently in communication with port 54. A Bowden control wire 37 (the other end of which is shown in Figure 3) has its flexible cable 49 attached to abutment 56. The Bowden wire 37 is pivotally attached to a point about the center of slide plate 55.

When handle 57 is pulled to the left, the slide plate 55 pivots about one corner 60 and simultaneously pulls Bowden wire 37 to release latch member 23 and places channel 59 in communication with port 53. Thus ports 53 and 54 are connected and air may enter tubular member 13 by way of tubing 22. Since the latch member 23 is disengaged, the piston 18 and slide 16 may fall to the ground. On release of handle 57 the slide 16 is locked in position to hold the vehicle in parking position.

When the engine 11 is running, by pushing handle 57 to the right the slide plate 55 will pivot about its other corner 61 and connect ports 52 and 54. The motion of slide plate 55 about corner 61 pulls Bowden wire 37 as before to release latch member 23. The vacuum produced by engine 11 may act through port 52, channel 59, port 54, tubing 22, and tubular member 13 to raise piston 18 and slide 16. On release of handle 57 the slide 16 will be locked in its raised position.

In Figure 7 a modified form of my invention is shown. At point 15 on the frame 12 there is firmly attached a member 62 extending laterally to either side of the motorcycle. At the points 14 of the frame 12 are firmly attached two laterally extending bars 63. To the end of each bar 63 there is pivotally attached a guard member 64 adapted to move in a generally vertical plane. The free end of each guard member 64 is adapted to meet the outer end of member 62 on the corresponding side of the machine. A cylindrical sleeve 65, slidably mounted on member 62, is adapted to slide outwardly to engage guard member 64 and lock it in the position shown in full lines. In that position members 62, 63, and 64 are adapted to serve as a shin protecting guard.

A ratchet wheel 66 is fastened to guard member 64 near the pivotal connection to bar 63. A ratchet pawl 67 is supported from bar 63 and adapted to engage ratchet wheel 66 to prevent the guard members 64 from turning in one direction unless the ratchet is disengaged.

The operation of the modification of Figure 7 is obvious. To park the machine in a vertical position the sleeves 65 are slid toward each other and the guard members 64 are allowed to drop to the roadway (as shown by dotted lines) in the direction of the free movement of the ratchet. When the guard members 64 rest on the roadway, the ratchets will hold them against rotation and the machine will remain supported vertically. When it is desired to use the machine, the ratchet pawls 67 are disengaged from their corresponding ratchet wheels 66; the guard members 64 are lifted to meet members 62; and the sleeves 65 are slid outwardly to lock guard members 64 in driving position.

It is obvious that the guard members 64 of this modification may be moved by power or, if preferred, by a manually operated lever on tank 40 attached by Bowden wires or the like to the guard members 64. This modification is also adapted to retain front wheel 10 raised free of the roadway.

It may equally be seen that the controls for the stand of any modification of my invention may be operated by any of the normal manual operating controls of a motorcycle, including the kick starter, the brake, the throttle, and other controls.

It is obvious also that the apparatus may be applied at the rear wheel of a motorcycle or other vehicle although much of the protective function would be lost in that case. It is also possible to arrange the device so that it may be positioned selectively to raise either wheel from the ground.

In accordance with the provisions of the patent statutes, I have described the principle of operation of my invention, together wth certain embodiments thereof; but I desire to have it understood that the apparatus shown is only illustrative, and that the invention may be carried out by other means.

What I claim as new and desire to secure by Letters Patent of the United States is—

1. A two-wheeled vehicle including a frame, a guard structure for the protection of the rider in collision, comprising tubular members rigidly connected to said frame ahead of the normal position of the rider and extending laterally of said frame in front of the rider, and means connected to said tubular members for maintaining said vehicle in an upright stationary position with respect to the roadway and adapted to be adjusted into and away from supporting position in contact with said roadway.

2. In combination, in a two-wheeled vehicle, a frame, a guard structure for the protection of the rider in collision, comprising tubular members on each side of said vehicle having substantially vertical and parallel portions spaced laterally of the vehicle and being rigidly connected to said frame ahead of the normal position of the rider, and means including rods slidably housed in said substantially vertical and parallel portions, adapted to maintain said vehicle in an upright stationary position with respect to the roadway, and adapted to be raised into said substantially vertical and parallel portions out of contact with said roadway.

3. In combination with a motorcycle having an internal combustion engine, a guard structure including tubular members on each side of the frame of said motorcycle rigidly connected thereto and having substantially vertical and parallel portions, rods housed within said substantially vertical and parallel portions and adapted to be lowered into contact with the roadway to maintain said vehicle in an upright stationary position, a piston connected to the upper end of each of said rods to form a sealed chamber within each of said tubular members, and means including a manually operable control mechanism for connecting each of said tubular members to the intake manifold of said engine.

4. In combination with a motorcycle having an internal combustion engine, a guard structure including tubular members on each side of the frame of said motorcycle rigidly connected thereto and having substantially vertical and parallel portions, rods housed within said substantially vertical and parallel portions and adapted to be lowered into contact with the roadway to maintain said motorcycle in an upright stationary position, locks fastened to said tubular members and adapted to lock said rods against motion with respect to said tubular members, a piston forming the upper end of each of said rods and adapted to seal said tubular members to form closed chambers therewithin, means including pipes and a valve for connecting said tubular members to the intake manifold of said internal combustion engine, and means including a control mechanism for moving said locks into and out of locking position and for operating said valve, said last mentioned means alternately allowing said rods to drop to the roadway and locking them there, and applying vacuum from said manifold to lift said rods within said substantially vertical and parallel portions and maintaining them in lifted position.

5. In a motorcycle, a frame, footboards located transversely of said frame, means wholly in advance of said footboards for supporting said motorcycle and protecting the rider in collision, said means comprising substantially horizontal transversely extending members rigidly connected to said frame, substantially vertical tubular members connected to said horizontal members and spaced laterally from said frame in a protecting position, supporting members slidably disposed within said vertical members, and releasable means for locking said supporting members within said vertical members.

6. In a motorcycle, a frame, footboards located transversely of said frame, means wholly in advance of said footboards for supporting said motorcycle and protecting the rider in collision, said means comprising a transversely disposed tubular guard member rigidly attached to said frame and spaced laterally therefrom in protecting position and a support member telescopically connected to said guard member.

7. A two-wheeled vehicle including a frame, a guard structure for the protection of the rider in collision, comprising rod members rigidly connected to said frame ahead of the normal position of the rider and extending laterally of said frame in front of the rider, and means including said rod members for maintaining said vehicle in an upright stationary position with respect to the roadway and adapted to be adjusted into and away from supporting position in contact with said roadway.

8. In a motorcycle, a frame, footboards located transversely of said frame, means wholly in advance of said footboards for supporting said motorcycle and protecting the rider in collision, said means comprising substantially horizontal transversely extending members rigidly connected to said frame, substantially vertical tubular members connected to said horizontal members, supporting members slidably disposed within said vertical members, vacuum connections including a hand controlled valve for connecting said tubular members at will to the intake manifold of the engine of said motorcycle, and releasable means for locking said supporting members within said vertical members.

C. S. MINTON.